United States Patent
Eckel

(10) Patent No.: US 10,033,211 B2
(45) Date of Patent: Jul. 24, 2018

(54) MULTILEVEL CONVERTER AND METHOD UTILIZING BLOCKING PERIODS FOR BALANCING THE VOLTAGES OF CAPACITORS OF THE SUBMODULES OF THE MULTILEVEL CONVERTER

(71) Applicant: SIEMENS AKTIENGESELLSCHAFT, München (DE)

(72) Inventor: Hans-Günter Eckel, Rostock (DE)

(73) Assignee: Siemens Aktiengesellschaft, Munich (DE)

( * ) Notice: Subject to any disclaimer, the term of this patent is extended or adjusted under 35 U.S.C. 154(b) by 187 days.

(21) Appl. No.: 14/911,530

(22) PCT Filed: Aug. 15, 2013

(86) PCT No.: PCT/EP2013/067078
§ 371 (c)(1),
(2) Date: Feb. 11, 2016

(87) PCT Pub. No.: WO2015/022030
PCT Pub. Date: Feb. 19, 2015

(65) Prior Publication Data
US 2016/0190846 A1    Jun. 30, 2016

(51) Int. Cl.
*H01M 10/44* (2006.01)
*H01M 10/46* (2006.01)
(Continued)

(52) U.S. Cl.
CPC .......... *H02J 7/0068* (2013.01); *H02M 7/483* (2013.01); *H02M 1/08* (2013.01); *H02M 2007/4835* (2013.01)

(58) Field of Classification Search
CPC ...... H02J 7/0014; H02J 7/0019; H02J 7/0021; H02J 7/0026; H02J 7/345
(Continued)

(56) References Cited

U.S. PATENT DOCUMENTS 9,787,173 B2 * 10/2017 Eckel ..................... H02M 1/32
2011/0222323 A1    9/2011 Dofnas et al.
(Continued)

FOREIGN PATENT DOCUMENTS

CN    103051167 A    4/2013
CN    103078539 A    5/2013
(Continued)

OTHER PUBLICATIONS

Rainer Marquardt et al; "Modulares Stromrichterkonzept fuer Netzkupplungsanwendugen bei hohen Spannungen"; Bauelemente der Leistungselektronik und Ihre Anwendungen: Vortraege der ETG-Fachtagung, Apr. 23-24, 2002; Bad Nauheim, Kurhaus, VDE-Verlag, Berlin, Jan. 1, 2002 (Jan. 1, 2002), Seiten 155-161; XP008105719, ISBN: 978-3-8007-2690-5; Seite 156, linke Spalte—Seite 157, linke Spalte.
(Continued)

*Primary Examiner* — Edward Tso
(74) *Attorney, Agent, or Firm* — Laurence Greenberg; Werner Stemer; Ralph Locher

(57) ABSTRACT

A multilevel converter has a central device for controlling operations and a plurality of series-connected sub modules that each has a first switch, a second switch, and a capacitor. At least two of the sub modules form a multi module, wherein, in charging phases and in discharging phases of the multi module, one of the switches of each sub module is switched off and the other switch of each sub module is switched on. The multi module has a control device that is connected to the central device and undertakes control of the
(Continued)

sub modules of the multi module on the basis of control signals from the central device. The control device is configured such that it monitors the capacitor voltages of the sub modules and, in the event of an imbalance in the capacitor voltages, brings about balancing.

13 Claims, 5 Drawing Sheets

(51) Int. Cl.
*H02J 7/00* (2006.01)
*H02M 7/483* (2007.01)
*H02M 1/08* (2006.01)

(58) Field of Classification Search
USPC .................. 320/107, 116, 117, 118, 166
See application file for complete search history.

(56) References Cited

U.S. PATENT DOCUMENTS

| | | |
|---|---|---|
| 2012/0161858 A1 | 6/2012 | Permuy et al. |
| 2013/0181531 A1* | 7/2013 | Deboy ............... H02J 3/385 307/82 |
| 2014/0175888 A1* | 6/2014 | Deboy ............... H02J 3/383 307/82 |
| 2017/0040885 A1 | 2/2017 | Wang et al. |

FOREIGN PATENT DOCUMENTS

| | | |
|---|---|---|
| EP | 2608383 A1 | 6/2013 |
| RU | 24740035 C2 | 1/2013 |
| WO | 2012087895 A1 | 6/2012 |

OTHER PUBLICATIONS

Marcos Balduino de Alvarenga et al: "Modulation strategy for minimizing communications and capacitor voltage balancing in symmetrical cascaded multilevel converters", Industrial Electronics (ISIE), 2011 IEEE International Symposium On, IEEE, Jun. 27, 2011 (Jun. 27, 2011), Seiten 1875-1880m XP032019326, DOI: 10.1109/ISIE.2011.5984443 ISBN: 978-1-4244-9310-4 Seite 1875-Seite 1877, linke Spalte: Abbildungen 1-4.

* cited by examiner

MULTILEVEL CONVERTER AND METHOD UTILIZING BLOCKING PERIODS FOR BALANCING THE VOLTAGES OF CAPACITORS OF THE SUBMODULES OF THE MULTILEVEL CONVERTER

BACKGROUND OF THE INVENTION

Field of the Invention

The invention relates to a multilevel converter having the features claimed in the preamble of the main device claim.

A multilevel converter of this type is described in the conference paper "Modulares Stromrichterkonzept für Netzkupplungsanwendungen bei hohen Spannungen" ("Modular power converter concept for mains-coupling applications at high voltages") presented at the ETG symposium "Bauelemente der Lesitungselektronik and ihre Anwendungen" ("Power electronics components and their applications"), 2002, Bad Nauheim, by Rainer Marquardt, Anton Lesnicar and Jurgen Hildinger, Institute of Electrical Drives Engineering, Power Electronics and Control at the Universität des Bundeswehr, Munich. The known multilevel converter is equipped with a plurality of series-connected sub modules, each of which comprises a first switch, a second switch and a capacitor, and, in discharge phases, gives out current by means of the capacitor, and, in charging phases, draws in current for charging the capacitor. A central device is used to control the operation of the multilevel converter.

BRIEF SUMMARY OF THE INVENTION

The object of the invention is to define a multilevel converter that has a particularly simple design but still allows precise control.

This object is achieved according to the invention by a multilevel converter having the features claimed in the main device claim. The dependent claims contain advantageous embodiments of the multilevel converter according to the invention.

Hence according to the invention at least two of the sub modules are connected in series to form a multi module, wherein in the charging phases and the discharge phases of the multi module, one of the switches of each sub module is off and the other switch of each sub module is on, and the multi module comprises a control device connected to the central device, which control device controls the sub modules of the multi module on the basis of control signals from the central device and is designed such that it monitors the capacitor voltages of the sub modules and, in the event of an imbalance in the capacitor voltages, produces balancing by providing at least one blocking period for each sub module that has a capacitor voltage that is too low compared with the capacitor voltage of the other sub modules of the multi module, in which blocking period the first switch and the second switch are off at the same time.

An essential advantage of the multilevel converter according to the invention can be considered that control of the sub modules need not be performed for all sub modules individually by the central device itself but instead can be performed by means of interposed control devices in the respective multi modules. The allocation of sub modules to multi modules relieves the control device of control tasks. In addition, the number of control lines can be reduced because it is no longer necessary for each sub module to be connected directly to the central device. Thus the design of the multilevel converter according to the invention is simpler than the design for known multilevel converters and hence the production costs fall.

Another essential advantage of the multilevel converter according to the invention can be considered that for said multilevel converter the capacitor voltages of the sub modules grouped together in the multi modules can be balanced very easily because balancing in the blocking periods according to the invention takes place automatically irrespective of the direction of flow of the module current flowing through the multi module and the sub modules thereof. This is because for sub modules that are in a blocking period, the capacitors can only be charged but not discharged. Thus for the purpose of balancing, there is no need to know or measure the direction of flow of the module current. Instead it is sufficient to provide the blocking periods according to the invention for sub modules that have a capacitor voltage that is too low. In other words, balancing is performed by allowing the capacitor to discharge for sub modules having a sufficient DC link voltage, and blocking the capacitor from discharging in the blocking periods for sub modules that have a DC link voltage that is too low.

It is considered advantageous if the control device determines for each sub module the difference between the capacitor voltage and the mean value of the capacitor voltages of the sub modules of the multi module, and, if the difference exceeds a predetermined threshold value, provides at least one blocking period for each of the sub modules concerned.

The control device preferably defines the time length of the blocking period specifically for each sub module on the basis of the imbalance in the capacitor voltages.

It is particularly advantageous if the control device determines for each sub module the difference between the capacitor voltage and the mean value of the capacitor voltages of the sub modules of the multi module, and defines the time length of the blocking period specifically for each sub module on the basis of the difference for that sub module between the capacitor voltage and the mean value, where the larger said difference between the capacitor voltage and the mean value is, the greater the associated time length of the blocking periods.

It is particularly advantageous if the control device is designed such that it actuates blocking periods in each case when it receives from the central device a control signal for switching the first switch and the second switch of the sub modules.

The first switch of each sub module is preferably connected in series with the capacitor, and the second switch is preferably electrically in parallel with the series circuit comprising capacitor and first switch.

With regard to the positioning in time of blocking periods, it is considered advantageous to design the control device such that it inserts the blocking periods in each case when the second switch is off or, on the basis of the control signal from the central device, is meant to be switched off, and the blocking periods are inserted at the expense of the on-period of the first switch.

It is particularly advantageous if the on-period of the first switch is made shorter symmetrically with respect to the off period of the second switch in order that the center axis of the output voltage pulses is maintained. Making symmetrical in this way can be achieved advantageously if the length of the blocking period before the first switch is switched on is made exactly the same size as the time length of the blocking period after the first switch is switched off again and the second switch is correspondingly switched on.

A first diode is preferably connected in parallel with the first switch, and a second diode in parallel with the second switch. A series circuit comprising a first diode and a second diode is preferably connected in parallel with the capacitor.

With regard to the diodes, it is considered advantageous if the anode terminal of the first diode is connected to the cathode terminal of the second diode, and the cathode terminal of the first diode is connected to a capacitor terminal of the capacitor, and the anode terminal of the second diode is connected to the other capacitor terminal of the capacitor.

The invention also relates to a method for operating a multilevel converter having a plurality of series-connected sub modules, each of which comprises a first switch, a second switch and a capacitor and, in discharge phases, gives out current by means of the capacitor, and, in charging phases, draws in current for charging the capacitor.

Regarding such a method, according to the invention at least two of the sub modules are connected in series to form a multi module, wherein in the charging phases and the discharge phases of the multi module, one of the switches of each sub module is off and the other switch of each sub module is on, and the capacitor voltages of the sub modules are monitored and, in the event of an imbalance in the capacitor voltages, balancing is produced by providing at least one blocking period for each sub module that has a capacitor voltage that is too low compared with the capacitor voltage of the other sub modules of the multi module, in which blocking period the first switch and the second switch are off at the same time.

Regarding the advantages of the method according to the invention, reference should be made to the above embodiments relating to the multilevel converter according to the invention, because the above embodiments apply accordingly to the method according to the invention.

The on-period of the first switch is preferably made shorter symmetrically with respect to the position in time of the off period of the second switch.

With regard to a symmetrical, i.e. centered, position in time of the on-period of the first switch relative to the off-period of the second switch of the sub module concerned, it is considered advantageous if two blocking periods are provided for each sub module that has a capacitor voltage that is too low compared with the capacitor voltage of the other sub modules of the multi module, in which blocking periods the first switch and the second switch are off at the same time, wherein the two blocking periods are of equal length and one of the blocking periods lies in the time interval after the second switch is switched off and before the first switch is switched on, and the other blocking period lies in the time interval after the first switch is next switched off (again) and before the second switch is next switched on (again).

BRIEF DESCRIPTION OF THE SEVERAL VIEWS OF THE DRAWING

The invention is explained in greater detail below with reference to exemplary embodiments in which, by way of example.

DESCRIPTION OF THE INVENTION

For the sake of clarity, the same reference signs are always used in the figures for identical or comparable components.

Figure 1:
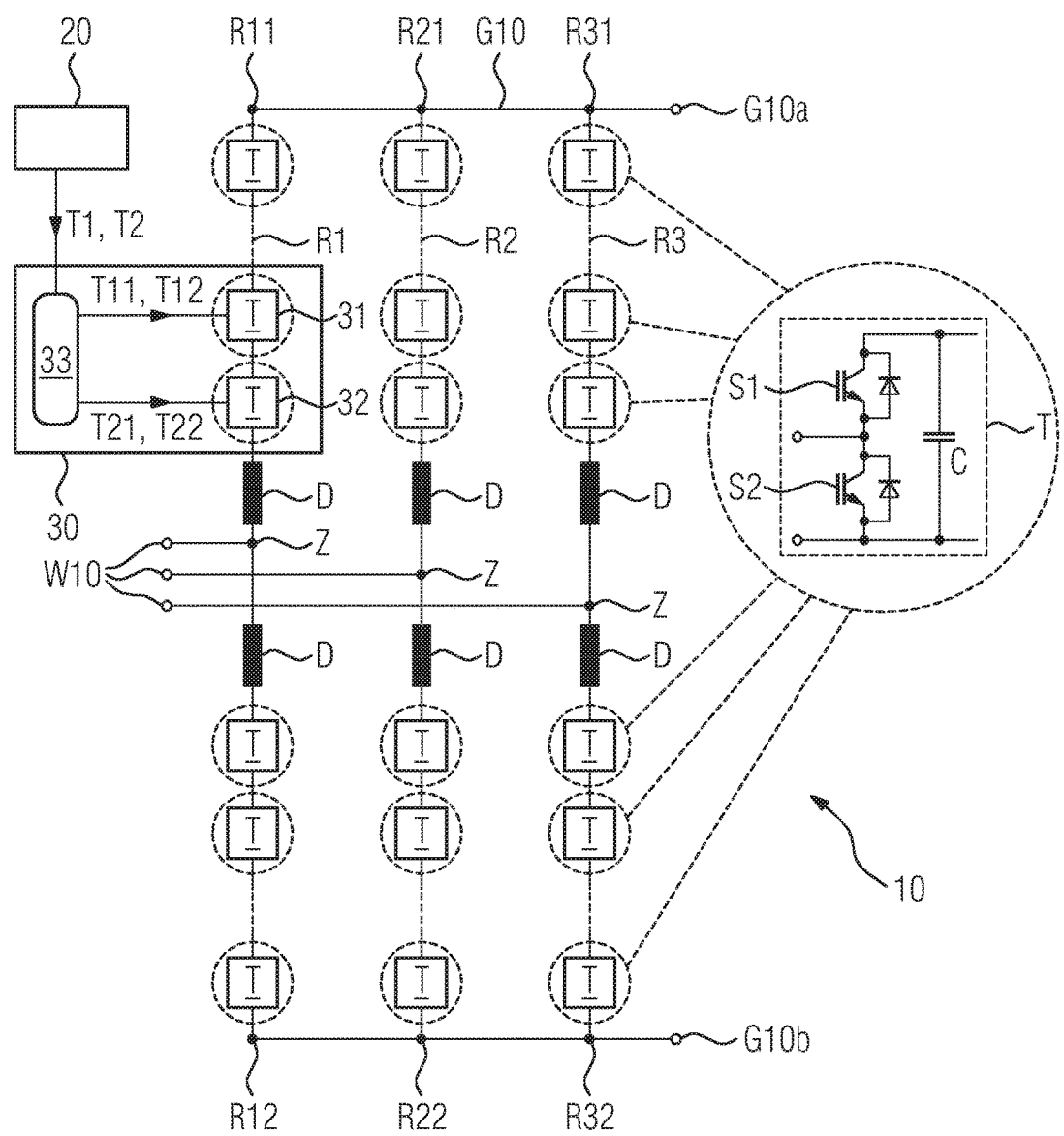
FIG. 1 shows an exemplary embodiment of a multilevel converter according to the invention.

FIG. 1 shows an exemplary embodiment of a three-phase multilevel converter 10. This converter comprises AC terminals W10 for feeding in AC current or feeding out or taking out AC current. In addition, the multilevel converter 10 has two voltage terminals G10a and G10b at which a DC current or a time-varying current, in particular also an AC current, can be fed in or taken out; the voltage terminals G10a and G10b are referred to below by way of example as "DC terminals" even though, as stated, it is not imperative to feed in or feed out solely DC current at these terminals.

The multilevel converter 10 comprises three parallel-connected series circuits R1, R2 and R3, the external terminals R11, R21 and R31 of which are connected to the DC terminal G10a. The external terminals R12, R22 and R32 are connected to the DC terminal G10b of the DC side G10. Thus in other words, the external terminals of the three series circuits R1, R2 and R3 form the DC side of the multilevel converter 10.

Each of the three series circuits R1, R2 and R3 is provided with a multiplicity of series-connected sub modules T and two inductors D. Between each pair of inductors D is an intermediate terminal Z, which in terms of potential lies between the sub modules at the top in FIG. 1 and the sub modules at the bottom in FIG. 1 and forms one of the three AC terminals W10 of the multilevel converter 10.

FIG. 1 also shows an example of the design of the sub modules T. In the exemplary embodiment shown in FIG. 1, each of the sub modules T comprises a first switch S1 (e.g. in the form of a transistor), a second switch S2 (e.g. in the form of a transistor) and a capacitor C.

In the multilevel converter 10 shown in FIG. 1, the sub modules T are controlled by a central device 20. In order to avoid the need for the central device 20 to be connected individually to each of the sub modules T so as to be able to effect control, in the exemplary embodiment shown in FIG. 1, individual sub modules or all the sub modules T are grouped together into multi modules.

In FIG. 1, an exemplary embodiment of such a multi module is denoted by the reference sign 30. The multi module 30 comprises two sub modules 31 and 32, which are controlled by a multi module-specific control device 33.

The central device 20 controls the multi module 30 by means of multi module-specific control signals T1 and T2, of which the control signal T1 is used for controlling the first switch of each of the two sub modules 31 and 32, and the control signal T2 is used for controlling the second switch of each of the two sub modules 31 and 32.

The central device 20 controls the multi module 30 preferably on the basis of the multi module DC link voltage, i.e. the voltage sum formed by the DC link voltages of the individual sub modules 31 and 32 of the multi module 30. In other words, for the purpose of control, the central device 20 preferably needs only one single voltage value per multi module rather than the individual capacitor voltages, i.e. the individual DC link voltages, of each of the sub modules 31 and 32, whereby the load on the central device 20 is reduced.

The function of the control device 33 is to process the control signals T1 and T2 from the central device 20 and to use the control signals T1 and T2 to form sub module-specific control signals T11, T12, T21 and T22 for controlling the switches of the two sub modules 31 and 32.

Another function of the control device 33 is to form the sum of the capacitor voltages of the capacitors of the sub modules 31 and 32, i.e. the sum of the individual DC link voltages, and to transmit to the central device 20 this sum, i.e. not the individual capacitor voltages, in other words the individual DC link voltages, from each of the sub modules. As already mentioned, the central device 20 uses the multi module DC link voltage to control the multi module 30.

Figure 2:
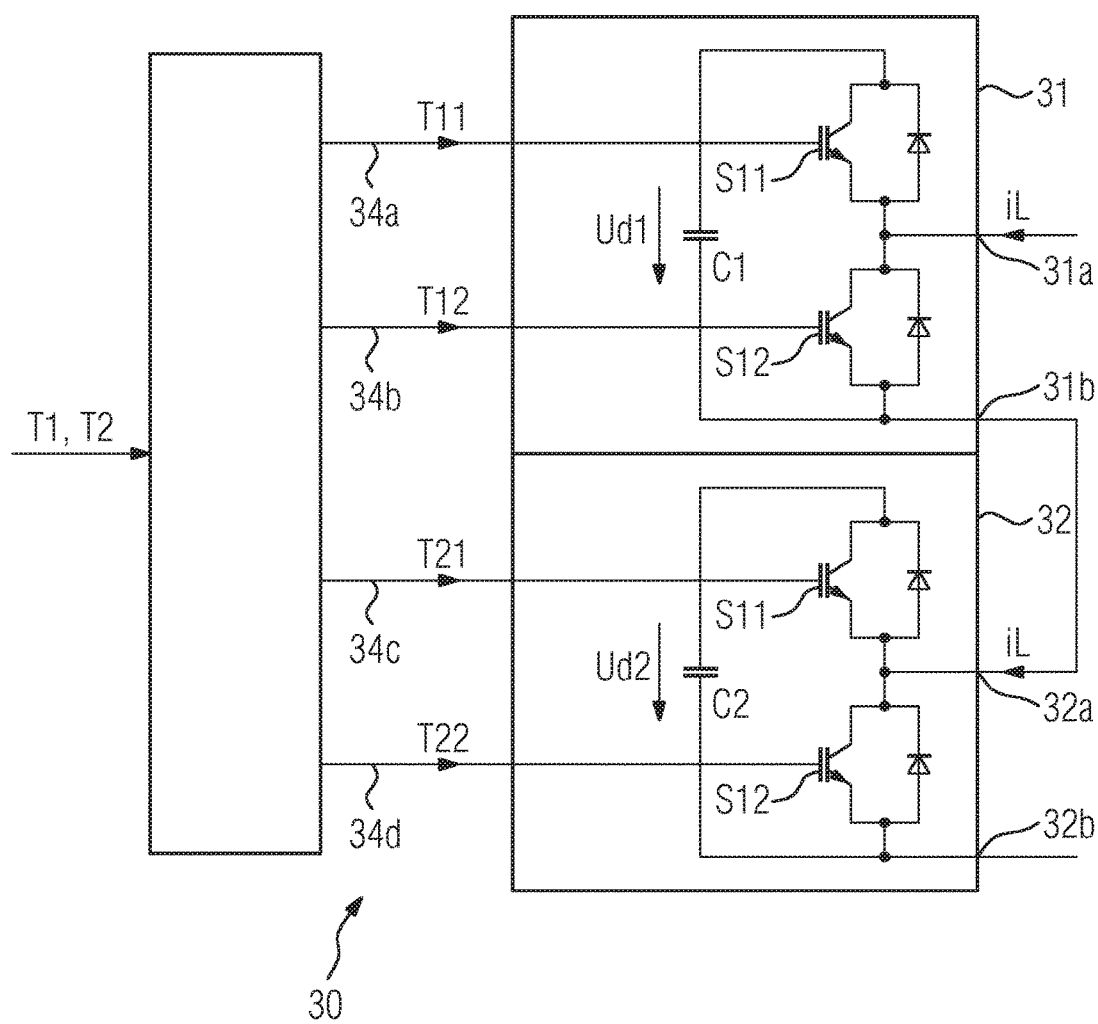
FIG. 2 shows in greater detail an exemplary embodiment of a multi module comprising two sub modules for the multilevel converter shown in FIG. 1.

FIG. 2 shows in greater detail the design of the multi module 30 of FIG. 1 by way of example.

The sub module 31 of the multi module 30 comprises a first switch S11, which is in series with a capacitor C1. The series circuit comprising the first switch S11 and the capacitor C1 is connected to module terminals 31a and 31b of the sub module 31. In parallel with the series circuit comprising the first switch S11 and the capacitor C1 is a second switch S12, which is connected directly to the two module terminals 31a and 31b.

The design of the sub module 32 is the same as the design of the sub module 31. A first switch S21 is in series with a capacitor C2, which series circuit is in parallel with a second switch S22. The terminals of the second switch S22, i.e. the terminals of the series circuit formed from the first switch S21 and the capacitor C2, form the module terminals 32a and 32b of the sub module 32.

For the purpose of controlling the switches of the two sub modules 31 and 32, the control signals T11, T12, T21 and T22 are transmitted to the four switches S11, S12, S21 and S22 via control lines 34a, 34b, 34c and 34d.

Figure 3:
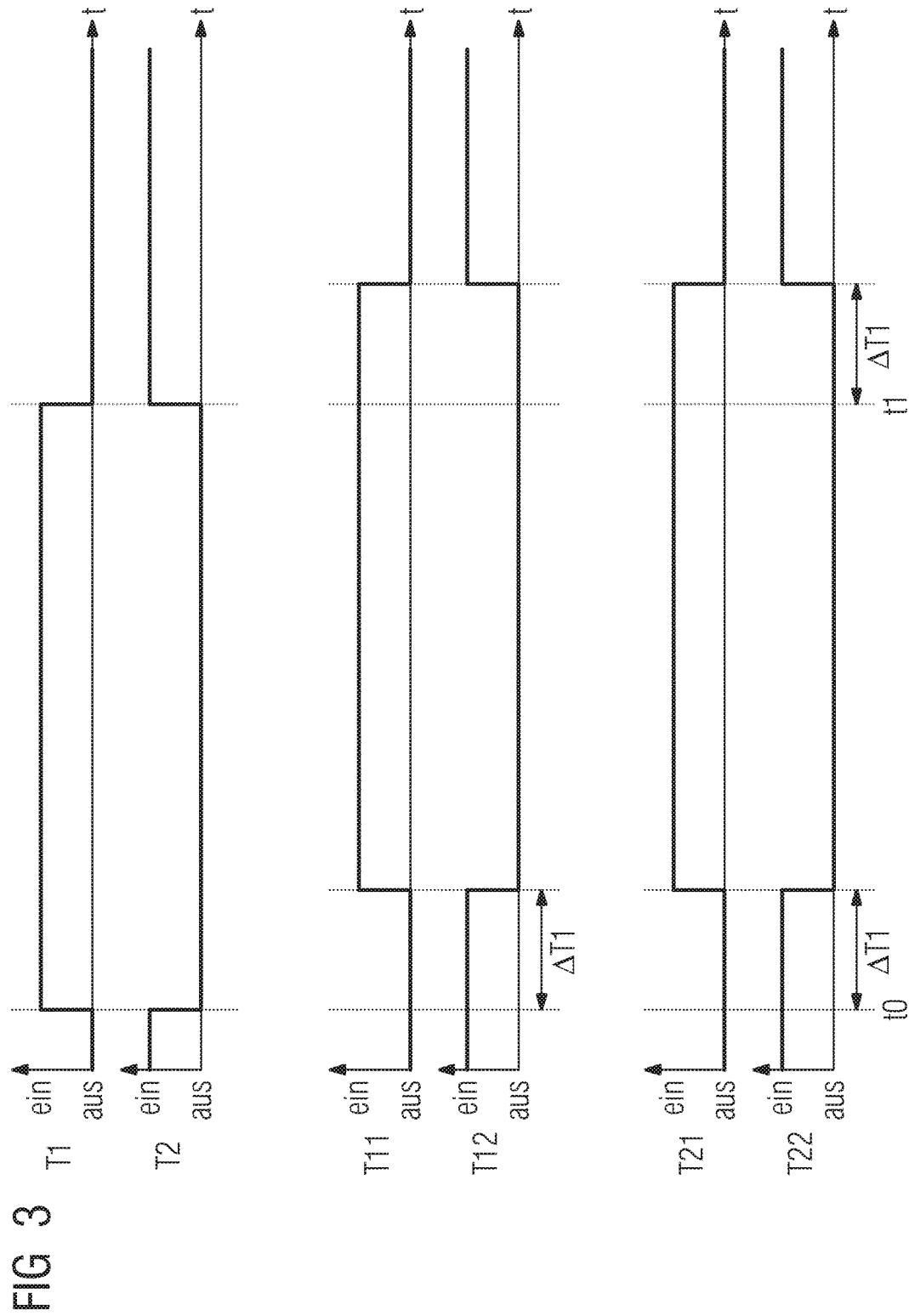
FIG. 3 shows by way of example the operation of the multi module of FIG. 2 for the case in which the capacitor voltages of the capacitors of the sub modules are identical or at least approximately identical.
Figure 4:
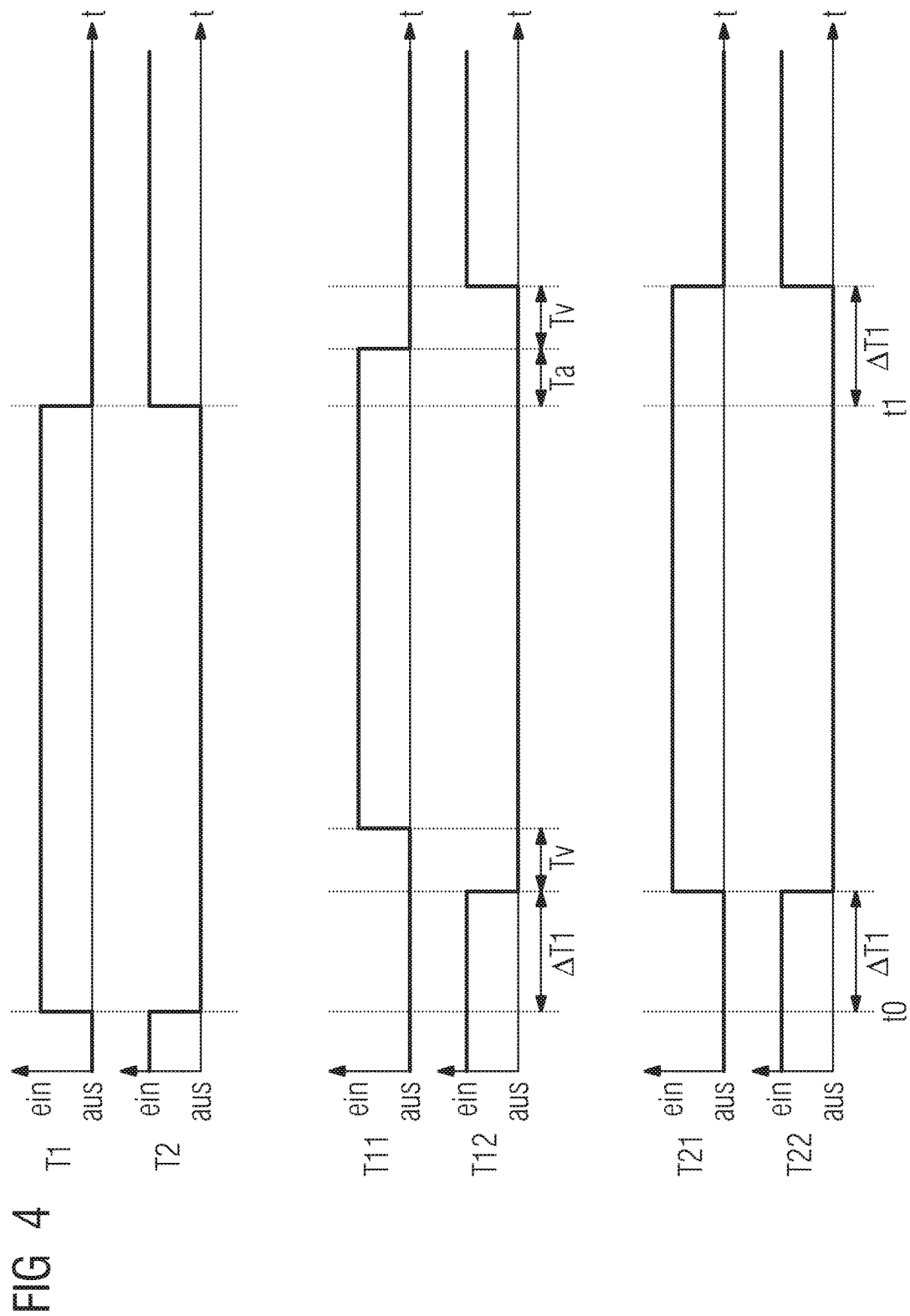
FIG. 4 shows by way of example the operation of the multi module of FIG. 2 for the case in which the capacitor voltages are imbalanced and the capacitor voltages are equalized by providing the blocking periods.

FIGS. 3 and 4 are used by way of example to explain in greater detail the operation of the control device 33 according to the module-specific control signals T1 and T2 from the central device 20.

FIG. 3 shows the operation of the control device 33 for the case in which the capacitor voltages Ud1 and Ud2 of the two capacitors C1 and C2 of the two sub modules 31 and 32 are identical or nearly identical. In such a case, the multi module specific control signals T1 and T2 are accordingly changed over at the end of a predetermined delay period ΔT1. It can be seen that, in accordance with the switchover command arriving at time t0 from the central device 20, the two first switches S11 and S21 of the two sub modules 31 and 32 (see FIG. 2) are switched on at the end of the delay period ΔT1. Correspondingly, the switch-off command received in the form of the control signal T2 at time t0 is implemented for the two second switches S12 and S22 of the two sub modules 31 and 32 (see FIG. 2) at the end of the delay period ΔT1.

Similarly, the four switches of the multi module 30 are switched as soon as a switchover command for switching these four switches is communicated by the central device 20 to the multi module 30 by an edge change in the multi module-specific control signals T1 and T2 at time t1.

FIG. 4 shows the operation of the control device 33 of the multi module 30 for the case in which the capacitor voltages Ud1 and Ud2 of the two capacitor C1 and C2 are of different magnitude, i.e. imbalanced. In the exemplary embodiment shown in FIG. 4, it is assumed by way of example that the capacitor voltage Ud1 is smaller than the capacitor voltage Ud2, and that the two capacitor voltages Ud1 and Ud2 are meant to be equalized.

If an edge change in the multi module-specific control signals T1 and T2 occurs at time t0 such that the two first switches S11 and S21 of the two multi modules 31 and 32 are meant to be switched on, and the two second switches S12 and S22 of the two sub modules 31 and 32 are meant to be switched off, then for the sub module 31, the capacitor voltage Ud1 of which is too small or smaller than the capacitor voltage Ud2, this switchover command is implemented for the first switch S11 with a time delay. Hence it can be seen in FIG. 4 that for the sub module 31 it is only the second switch S12 that is switched within the delay period ΔT1. The switch-on command for switching on the first switch S11, however, is delayed with respect to said switching of the second switch, namely not until the end of a blocking period Tv. The length of the blocking period Tv is preferably greater, the greater the difference between the capacitor voltages Ud1 and Ud2. Preferably the following is true:

$$Tv = k*(Ud1 - Ud2),$$

where k denotes a proportionality factor.

Thus in the blocking period Tv, both switches S11 and S12 are off for the sub module 31.

With regard to the sub module 32, the control device 33 does not modify the switching of the two switches S21 and S22. This means that the required switching of the two switches takes place at the end of the delay period ΔT1, as is specified by the multi module-specific control signals T1 and T2 at the time to.

If at time t1, a further switchover command in the form of an edge change of control signals T1 and T2 is received at the control device 33, then the first switch S11 of the sub module 31 is preferably switched before the second switch S12, namely earlier by a time interval that equals the time length of the blocking period Tv for the preceding switch on. In order to make the signal waveform of the control signal T11 symmetrical in this way with respect to the control signal T12, the first switch S11 is preferably switched after a time interval Ta after arrival of the edge change in the control signals T1 and T2 at time t1, where the following holds:

$$Ta = \Delta T1 - Tv$$

The three other switches, i.e. the second switch S12 of the sub module 31 and the two switches S21 and S22 of the sub module 32 shown in FIG. 2, are switched at the end of the delay period ΔT1 as specified by the module-specific control signals T1 and T2, which is also what happens in the case in which there is a balanced distribution of the capacitor voltages and which was explained in connection with FIG. 3.

The function of the blocking periods Tv is explained in greater detail below with reference to the sub module 31.

Figure 5:
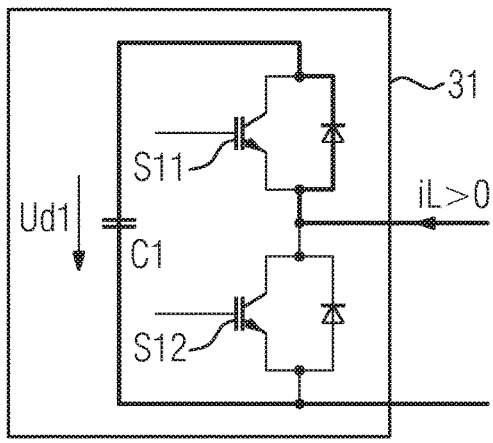
FIG. 5 shows by way of example the current flow through a "blocked" sub module of the multi module of FIG. 2 during the blocking period for a positive module current, which charges the DC link of the sub module.

FIG. 5 shows the operation of the sub module 31 in the case of too small a capacitor voltage Ud1, i.e. during blocking periods Tv provided for this reason (see FIG. 4). FIG. 5 uses thicker lines to visualize in this case the current flow iL during the blocking periods Tv for a positive current iL (iL>0). It is evident that the capacitor C1 is being charged and its capacitor voltage Ud1 is rising.

Figure 6:
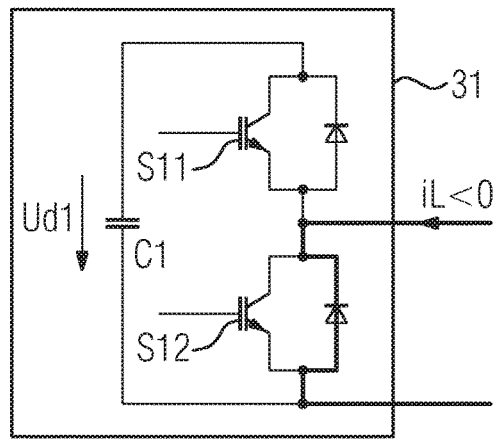
FIG. 6 shows the current flow for the "blocked" sub module during the blocking period for a negative module current.

FIG. 6 shows the operation of the sub module 31 during the blocking periods Tv (see FIG. 4) for a negative current iL (iL<0). In the case of a negative current iL, the capacitor voltage Ud1 of the capacitor C1 remains unchanged because the current iL bypasses the capacitor C1.

Figure 7:
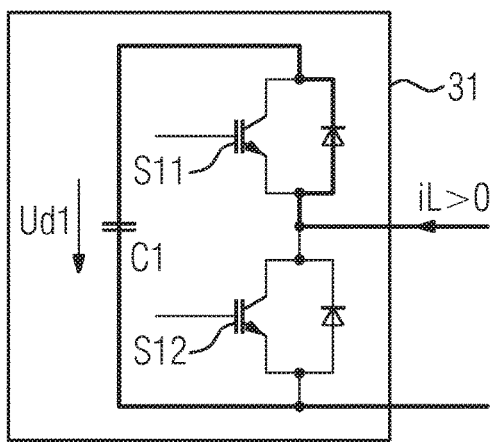
FIG. 7 shows for the purposes of comparison the current flow through the "unblocked" sub module during the normal on-period of the first switch of the sub module for a positive module current.

For the purpose of comparison, FIG. 7 shows the operation of the sub module 31 for a positive current iL (iL>0) during the "normal" on-period of the first switch S11 of the sub module 31. It is apparent that the capacitor C1 of the sub module 31 is being charged in this time interval.

Figure 8:
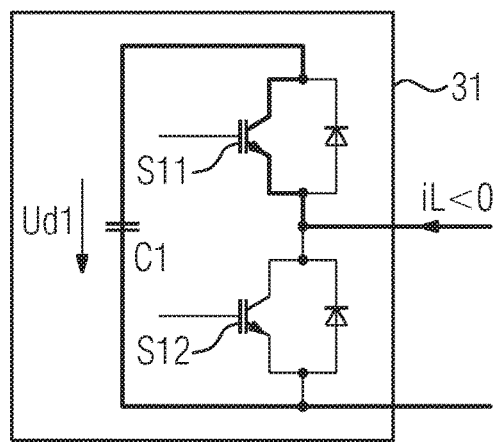
FIG. 8 shows for the purposes of comparison the current flow through the "unblocked" sub module during the normal on-period of the first switch for a negative module current.

FIG. 8 shows for the purpose of comparison the operation of the sub module 31 for a negative current iL (iL<0) during the "normal" on-period of the first switch S11. It is apparent that the capacitor C1 of the sub module 31 is being discharged.

Thus to summarize, during the "normal" on-period of the first switch S11 of the sub module 31, the capacitor C1 is charged or discharged according to the direction of flow of the module current iL. In the blocking period Tv, however, it is only possible to charge the capacitor C1, namely while there is a positive current iL, whereas discharging the capacitor C1 is blocked. As a result of this blocking, the DC link voltage of the sub module 31, i.e. the capacitor voltage Ud1 of the capacitor C1, will rise during the blocking periods Tv (see FIG. 4) with respect to the DC link voltage of the sub module 32, i.e. the capacitor voltage Ud2 of the capacitor C2, resulting in equalization of the capacitor voltages Ud1 and Ud2.

The multilevel converter 10 shown in FIG. 1 and the multi module 30 shown in FIG. 2 is preferably operated as summarized below:

The balancing of the partial DC link voltages of the individual sub modules 30 and 31 is preferably performed by a variable blocking period Tv between the switches of the respective sub modules. During the blocking periods Tv, both switches of each currently blocked sub module are off.

During the blocking periods, in each case according to the direction of flow of the current flowing through the sub module, either the capacitor of the sub module is charged (for a positive current iL>0) or the DC link voltage remains unchanged.

Blocking phases are preferably provided both before and after the particular on-period of the first switch of the sub module to be blocked, and are provided symmetrically in the sense that the on-period of the first switch of the sub module lies symmetrically in time with respect to the off-period of the second switch. Making the on-period symmetrical in this way means that the center axis of the output voltage pulses can be maintained.

The operation of the multi modules was explained in connection with FIGS. 2 to 8 by way of example for the case in which the multi module comprises two sub modules. The sub modules can be controlled in a corresponding manner if the multi module comprises more than two sub modules. In such a case it is considered advantageous to provide blocking periods for each sub module that has a capacitor voltage that is lower than the mean value of the DC link voltages of the sub modules of this multi module, in which blocking periods the on-period of the first switch of the sub module concerned is shortened, which on period is required by the central device, and both switches of the sub module are off. For a negative module current iL<0, the "discharge DC link" state that would arise during the "normal" on-period of the first switch is thereby replaced during the blocking period by the "DC link voltage unchanged" state. Thus by means of the blocking phases it is possible to achieve that the DC link voltages of the blocked sub modules rise with respect to the DC link voltage of the other, non-blocked sub modules during a cycle of the fundamental frequency.

Although the invention has been illustrated and described in greater detail using preferred exemplary embodiments, the invention is not limited by the disclosed examples, and a person skilled in the art can derive other variations therefrom without departing from the scope of protection of the invention.

LIST OF REFERENCES 10 multilevel converter
20 central device
30 multi module
31 sub module
31a module terminal
31b module terminal
32 sub module
32a module terminal
32b module terminal
33 control device
34a control line
34b control line
34c control line
34d control line
C capacitor
C1 capacitor
C2 capacitor
D inductor
G10 DC side
G10a voltage terminal
G10b voltage terminal
iL current flow
R1 series circuit
R11 external terminal of the series circuit R1
R12 external terminal of the series circuit R1
R2 series circuit
R21 external terminal of the series circuit R2
R22 external terminal of the series circuit R2
R3 series circuit
R31 external terminal of the series circuit R3
R32 external terminal of the series circuit R3
S1 switch
S11 switch
S12 switch
S2 switch
S21 switch
S22 switch
t0 point in time
t1 point in time
T1 control signal
T11 control signal
T12 control signal
T2 control signal
T21 control signal
T22 control signal
Ta time interval
Tv blocking period Ud1 capacitor voltage
Ud2 capacitor voltage
W10 AC terminal
Z intermediate terminal
ΔT1 delay period

The invention claimed is:

1. A multilevel converter, comprising
a plurality of series-connected sub modules, each of said sub modules having a capacitor and switches including a first switch and a second switch, and, in discharge phases, gives out current by means of said capacitor, and, in charging phases, draws in the current for charging said capacitor;
a central device for controlling an operation of the multilevel converter; and
at least two of said sub modules being connected in series to form a multi module, wherein in the charging phases and the discharge phases of said multi module, one of said switches of each of said sub modules of said multi module is off and another of said switches of each of said sub modules is on, said multi module having a control device connected to said central device, said control device controlling said sub modules of said multi module on a basis of control signals from said central device, wherein said control device being configured such that said control device monitors capacitor voltages of said sub modules of said multi module and, in an event of an imbalance in the capacitor voltages, produces balancing by providing at least one blocking period for each of said sub modules that has a capacitor voltage that is too low compared with the capacitor voltage of the other said sub modules of said multi module, in said blocking period said first switch and said second switch are off at a same time.

2. The multilevel converter according to claim 1, wherein said control device defines a time length of the blocking period specifically for each of said sub modules on a basis of the imbalance in the capacitor voltages.

3. The multilevel converter according to claim 1, wherein said control device determines for each of said sub modules a difference between the capacitor voltage and a mean value of the capacitor voltages of said sub modules of said multi module, and, if the difference exceeds a predetermined threshold value, provides at least one blocking period for each of said sub modules concerned.

4. The multilevel converter according to claim 1, wherein said control device determines for each said sub modules a difference between the capacitor voltage and a mean value of the capacitor voltages of said sub modules, and defines a time length of blocking periods specifically for each of said sub modules on a basis of the difference for that said sub module between the capacitor voltage and the mean value, where a larger the difference between the capacitor voltage and the mean value is, a greater an associated time length of the blocking periods.

5. The multilevel converter according to claim 1, wherein said control device is configured such that said control device actuates blocking periods in each case when said control device receives from said central device a control signal for switching said first switch and said second switch of said sub modules.

6. The multilevel converter according to claim 1, wherein said first switch of each of said sub modules is connected in series with said capacitor, and said second switch is electrically in parallel with a series circuit containing said capacitor and said first switch.

7. The multilevel converter according to claim 1, wherein said control device is configured such that said control device inserts blocking periods in each case when said second switch is off or, on a basis of a control signal from said central device, is meant to be switched off, and the blocking periods are inserted to shorten an on period of said first switch.

8. The multilevel converter according to claim 1, wherein each of said sub modules having a first diode connected in parallel with said first switch, and a second diode connected in parallel with said second switch.

9. The multilevel converter according to claim 1, wherein each of said sub modules having a series circuit containing a first diode and a second diode connected in parallel with said capacitor.

10. The multilevel converter according to claim 9, wherein an anode terminal of said first diode is connected to a cathode terminal of said second diode, and a cathode terminal of said first diode is connected to a first terminal of said capacitor, and an anode terminal of said second diode is connected to a second terminal of said capacitor.

11. A method for operating a multilevel converter having a plurality of series-connected sub modules, each of the sub modules having a first switch, a second switch and a capacitor, and, in discharge phases, gives out current by means of the capacitor, and, in charging phases, draws in current for charging the capacitor, at least two of the sub modules are connected in series to form a multi module, which comprises the steps of:
during a performance of the charging phases and the discharge phases of the multi module, one of the switches of each sub module is off and the other switch of each sub module is on;
monitoring capacitor voltages of the sub modules; and
in an event of an imbalance in the capacitor voltages, balancing is produced by providing at least one blocking period for each sub module that has a capacitor voltage that is too low compared with the capacitor voltage of other sub modules of the multi module, in the blocking period the first switch and the second switch are off at a same time.

12. The method according to claim 11, which further comprises making an on-period of the first switch shorter symmetrically with respect to a position in time of an off period of the second switch.

13. The method according to claim 11, which further comprises:
providing two blocking periods for each of the sub modules that have the capacitor voltage that is too low compared with the capacitor voltage of the other sub modules of the multi module, in which blocking period the first switch and the second switch are off at the same time, wherein the two blocking periods are of equal length and one of the blocking periods lies in a time interval after the second switch is switched off and before the first switch is switched on, and the other blocking period lies in a time interval after the first switch is switched off again and before the second switch is switched on again.

* * * * *